United States Patent [19]

Sugawara et al.

[11] Patent Number: 4,926,187

[45] Date of Patent: May 15, 1990

[54] RADIO-FREQUENCY IDENTIFICATION SYSTEM

[75] Inventors: Hideo Sugawara; Hideo Ashida, both of Ohtawara, Japan

[73] Assignee: Fujitsu Limited, Kawasaki, Japan

[21] Appl. No.: 249,768

[22] Filed: Sep. 26, 1988

[30] Foreign Application Priority Data

Sep. 24, 1987 [JP] Japan .................................. 62-239204
Feb. 4, 1988 [JP] Japan .................................. 63-024178
Feb. 4, 1988 [JP] Japan .................................. 63-024181

[51] Int. Cl.$^5$ ...................... H01Q 21/06; G01S 13/74
[52] U.S. Cl. ........................................ 342/361; 342/44
[58] Field of Search ........................... 342/361, 365, 44

[56] References Cited

U.S. PATENT DOCUMENTS 4,360,810  11/1982  Landt ..................................... 342/44
4,737,793   4/1988  Munson et al. ..................... 342/361

FOREIGN PATENT DOCUMENTS 0119870  9/1981  Japan ..................................... 342/42

Primary Examiner—Thomas H. Tarcza
Assistant Examiner—Gregory C. Issing
Attorney, Agent, or Firm—Staas & Halsey

[57] ABSTRACT

A radio-frequency identification (RF-ID) system including a master unit and a sub unit connected thereto by radio-communication, and used for identifying a moving article on which the sub unit is mounted. The master unit transmits a circularly polarized wave having two carrier components (CW1, CW2), and the sub unit, which does not include carrier generators and branching filters, is powered by a battery provided therein. The sub unit receives the circularly polarized wave, separates the two carrier components by a hybrid circuit, and transmits another circularly polarized wave base upon the received carrier component. The sub unit may be operated in response to a starting command from the main unit, and the main unit may have first and second detecting units separated by n·λg/8, n: an odd integer, and λg: effective wave length, to eliminate the occurrence of null point phenomenon.

24 Claims, 13 Drawing Sheets

SUB UNIT

MAIN UNIT

SUB UNIT

MAIN UNIT

TRANSPONDER

INTERROGATOR

RADIO-FREQUENCY IDENTIFICATION SYSTEM

BACKGROUND OF THE INVENTION

1. Field of the Invention

The present invention relates to a radiofrequency identification (RF-ID) system used for identifying an article having a sub unit mounted thereon and managing the article therethrough. More particularly, it relates to an improved RF-ID system in which the power consumption of a sub unit is reduced and/or the null point phenomenon at a master unit is eliminated.

2. Description of the Related Art

RF-ID systems (or data carrier systems) are applied to, for example, an automobile production line. The RF-ID system comprises master units installed at work portions in the production line and sub units mounted on semifinished automobiles, and communication between the master units and the sub units is realized by radio-frequency (RF) signals. Each sub unit stores an identification code and production data of an automobile to be worked. A semifinished automobile having the sub unit mounted thereon and moving along the production line is identified by the master unit and worked in accordance with the production data stored in the sub unit. After completion of the working, thereat, data in the sub unit is updated and the semifinished automobile is transferred to a next production process, wherein the semifinished automobile is again identified and worked on. In view of the flexibility now required of manufacturing lines, the RF-ID systems are a highly efficient way of managing production lines.

The RF-ID systems also can be used for identifying a person mounting a sub unit as an identification card. More specific RF-ID systems will be described later with reference to the drawings.

Among the problems of the RF-ID system, each such unit is powered by a battery mounted therein, and thus must have a low power consumption, and a master unit suffers from the occurrence of a null (zero) point phenomenon when a sub unit is moved. These problems have not been solved by the prior art RF-ID systems.

JPA No. 54-121093, entitled "Microwave System" and published on Sep. 19, 1979, discloses a moving article identification system which includes an interrogator and a transponder. In this system, to suppress a wave having an adverse affect, due to a Doppler effect, an interrogation wave transmitted from the interrogator and a response wave transmitted from the transponder are different from each other. For example, when the interrogation wave is a vertical polarized wave, the response wave is a horizontal polarized wave, and when the interrogation wave is a right rotation circularly polarized wave, the response wave is a left rotation circularly polarized wave. JPA No. 54-121093, however, does not disclose a method of reducing the power consumption of the sub unit, or a way of eliminating the occurrence of the null point phenomenon.

JPA No. 57-79476, entitled, "Discrimination System" and published on May 18, 1982, discloses an identification system which can be used for identifying a person, for identifying an automobile, and for sensing a speed thereof, etc. In this system, the interrogation transmits only a carrier having a frequency $f_0$ to a transponder, and the transponder, having a coding modulator, low frequency generators generating low frequencies $f_1$ and $f_2$, and a code generator, transmits a response signal having a frequency $f_0 \pm f_1$ or $f_0 \pm f_2$, using the carrier from the interrogation. Nevertheless, this identification system can be used only for identifying an article, i.e., can not be used in, for example, an automobile production line in which semifinished automobiles are managed through sub units (transponders). In addition, this identification system cannot eliminate the occurrence of the null point phenomenon.

JPA No. 53-18109, described later in detail with reference to the drawings, discloses a circuit construction by which the null point phenomenon is eliminated, but this circuit construction is very complex.

SUMMARY OF THE INVENTION

According to the present invention, there is provided a radio frequency identification system including: a main unit including a main modulation and demodulation (modem) portion, a main transmission portion, and a main reception portion; a sub unit, radio communicatable with the main unit through a radiocommunication channel, including a sub reception portion, a sub modem portion, a sub transmission portion, and a small size battery supplying power to the sub reception portion, the modem and the transmission portion. The main modem portion outputs a first modulation signal modulated a first transmission data with a first carrier having a first frequency and a second carrier having a second frequency close to the first frequency; and the main transmission portion receives the first modulation signal and the second carrier and generates a first circularly polarization wave having a first rotation, on the basis of the received first modulation signal and the second carrier. The sub reception portion receives the first circularly polarized wave and separates into the first modulation signal and said second carrier. The sub modem portion demodulates the first modulation signal to recover the first transmission data, and modulates a second transmission data with the separated second carrier to output a second modulation signal. The sub transmission portion generates a second circularly polarization wave having a rotation equal to the first rotation on the basis of the said second modulation signal. The main reception portion receives the second circularly polarization wave and outputs the second modulation signal, and the main modem portion demodulate the second modulation signal to recover the second transmission data.

The sub modem includes a sub demodulation portion for demodulating the first modulation signal and a sub modulation portion for modulating the second transmission data with the separated second carrier. The main modem portion outputs a starting modulation signal modulated a start data with the first carrier, and the main transmission portion generates a starting circularly polarization wave having a second rotation reverse to the first rotation, on the basis of the starting modulation signal and said second carrier. The sub modulation portion is not supplied with power from the battery in a normal state. The main unit initiates communication by transmitting the starting circularly polarization wave to the sub unit, and the sub demodulation portion detects the starting circularly polarization wave and trigger the sub modulation portion in response to a reception of the starting circularly polarization portion.

The power supplied from the battery to the sub modulation portion is stopped after completion of a data transmission from the sub unit.

The sub unit includes a data processing portion, operatively connected to the sub demodulation portion and the sub modulation portion, for receiving the first transmission data and sending the second transmission data.

The data processing portion is supplied with power from the battery when the starting circularly polarization wave is received, and is not supplied with power after completion of the data transmission from the sub unit.

The main modem portion may include a signal transfer line, a first detection and phase-shift circuit, a second detection and phase-shift circuit, and an adder for adding signals from the first and second detection and phase-shift circuits.

The first and second detection and phase-shift circuits are connected to the signal transfer line, and spaced at $(\lambda g/8)n$ where $\lambda g$ is an effective wave length of the carrier, and n is an odd integer.

According to the present invention, there is also provided a radio frequency identification system including: a main unit including a main modulation and demodulation (modem) portion, a main transmission portion and a main reception portion; and a sub unit, radio communicatable with the main unit through a radio-communication channel, including a sub reception portion, a sub modem portion, a sub transmission portion, and a small size battery supplying power to the sub reception portion, the modem and the transmission portion. The main modem portion includes a signal transfer line, a first detection and phase-shift circuit, a second detection and phase-shift circuit, and an adder for adding signal from the first and second detection and phase-shift circuits. The first and second detection and phase-shift circuits are connected to the signal transfer line, and spaced at $(\lambda g/8)n$, where $\lambda g$ is an effective wave length of a reception signal, and n is an odd integer.

The sub unit may be mounted on a moving object, and the main unit may be installed a fix portion.

BRIEF DESCRIPTION OF THE DRAWINGS

Other objects and features of the present invention will be described with reference to the accompanying drawings, in which.

DESCRIPTION OF THE PREFERRED EMBODIMENTS

Before describing the preferred embodiments of the present invention, a prior art RF-ID system will be described.

Figure 1:
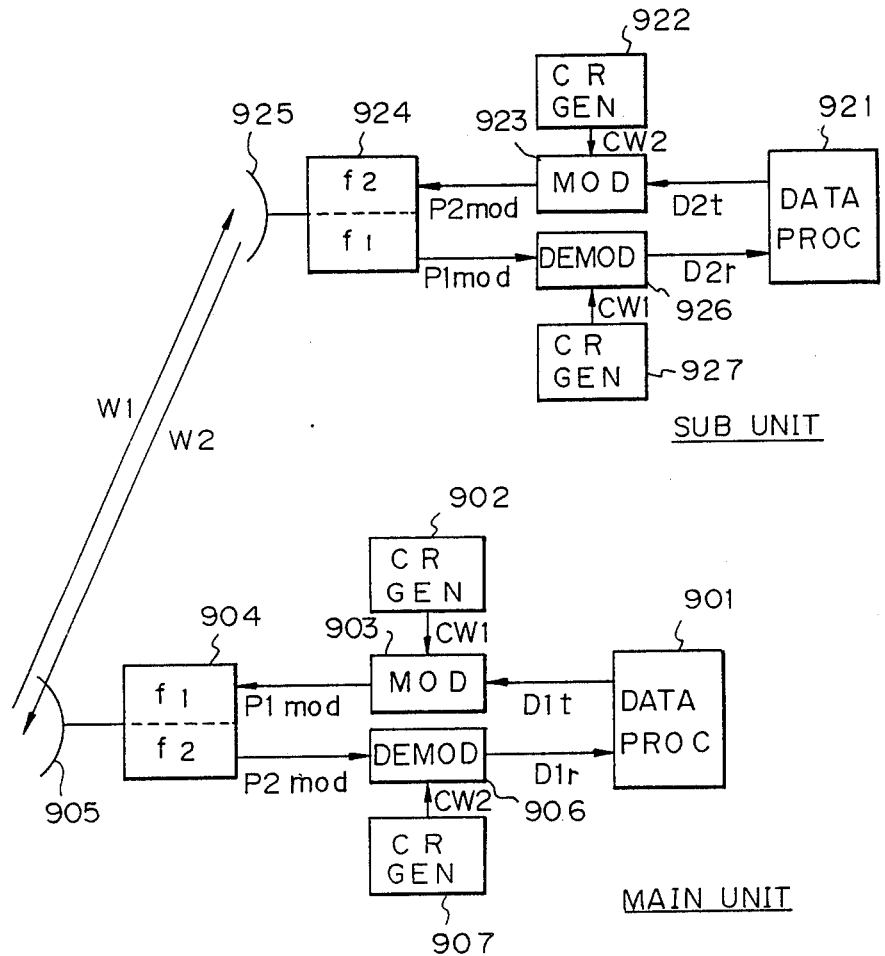
FIG. 1 is a block diagram of an RF-ID system of a prior art.

FIG. 1 shows a system configuration of a prior art RF-ID system. The RF-ID system includes a fixedly installed main unit (MAIN UNIT), and a sub unit (SUB UNIT) mounted on a moving object (article), such as a semifinished automobile. The main unit includes a data processor 901, a first carrier generator 902, a modulator 903, a wave branching filter 904, an antenna 905, a demodulator 906, and a second carrier generator 907. The sub unit includes a data processor 921, a third carrier generator 922, a modulator 923, a wave branching filter 924, an antenna 925, a demodulator 926, and a fourth carrier generator 927. An identification code and production data are previously stored in a memory in the data processor 921 by a master radio frequency unit (not shown).

The RF-ID system uses two radio frequencies f1, for example, f1=2.45 GHz, and f2, for example, f2=2.44 GHz, in the same frequency band for transmission and reception between the main unit, and the sub unit. The common antennas 905 and 926 are used for this communication. The main unit, and the sub unit themselves generate carrier microwaves CW2. The carrier microwave CW2 of the sub unit is modulated with data D2t which identifies a moving object, to provide a modulated wave P2mod. A transmission wave of a central frequency f2 of the modulated wave P2mod is separated from a reception wave W1 in the branching filter 924 and transmitted to the main unit.

In the main unit, the modulated wave transmitted from the sub unit is received by the antenna 905, separated by the branching filter 904, and demodulated by the demodulator 906 to output demodulated reception data D1r. The reception data D1r is processed in the data processor 901 to identify the type etc., of moving article.

As described above, a conventional RF-ID system may achieve production management by sending identification data of the moving object on which the sub unit is mounted, to the main unit. However, the sub unit generates the microwave carrier CW2 by the carrier generator 922, modulates it with the transmission data D2t, and transmits it to the main unit via the branching filter 924, and therefore, a problem arises in that the size of the sub unit becomes large and consumes too much power. More specifically, the carrier generators cannot be formed using C-MOS circuits, and thus the power consumption is large. For example, a current of each of the carrier generators 922 and 927 is 30 mA, and a current of the data processor 321 is 1.5 mA. Compared with the other circuit elements above, the currents of the carrier generators 922 and 927 are large. Also, the other circuit elements can be placed in a sleep mode, but the carrier generator 927 and the demodulator 926 must be always placed in an operative state to receive the signal from the main unit. Therefore, the carrier generators 922 and 927 consume a large amount of the power of the battery, and thus reduce the life of the battery. In addition, the branching filter 924 is bulky and expensive.

Now, a principle of a first embodiment of the present invention, by which the above problems are eliminated, will be described with reference to FIG. 2.

The above problems are solved by the present invention in which a main unit transmits a modulated wave P1mod derived by modulating a carrier wave CW1 with transmission data D1t as well as transmitting an unmodulated carrier wave CW2. A sub unit does not include carrier generators 922 and 927 and does not generate a carrier microwave but uses the unmodulated carrier wave CW2 received from the main unit to send it with a necessary transmission data D2t back to the main unit. Further, the present invention uses quadrature hybrid circuits and circularly polarizing antennas, and thus the branching filter 924 can be omitted.

Figure 2:
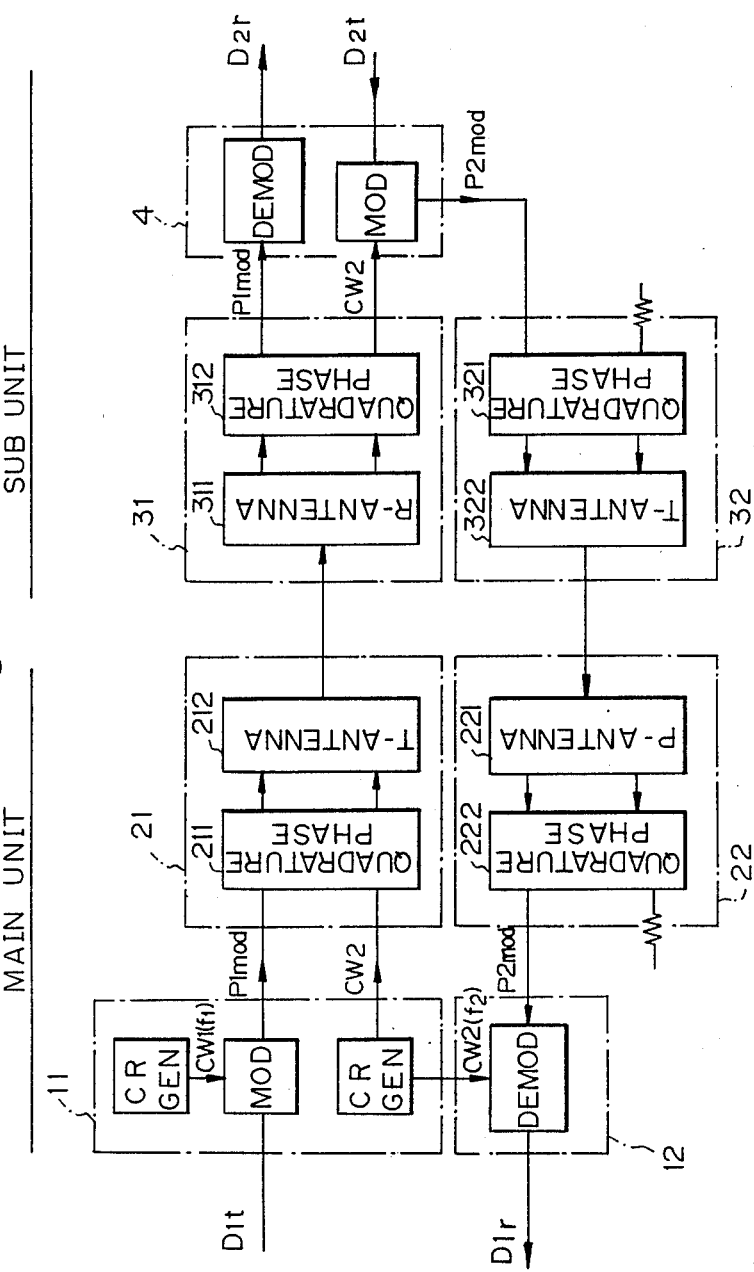
FIG. 2 is a principle block diagram showing the constitution of first and second embodiments of an RF-ID system in accordance with the present invention.

In FIG. 2, the numeral 11 represents a modulation portion of a main unit, for outputting a modulated wave P1mod derived by modulating, with transmission data D1t, one carrier wave CW1 of two carrier waves CW1 and CW2 in the same frequency band, as well as outputting an unmodulated wave CW2 of the other carrier wave CW2. Numeral 21 represents a transmission portion of the main unit, in which the modulated wave P1mod and unmodulated wave CW2 output from the modulation portion 11 of the main unit are input to a quadrature phase device 211, the outputs of which are applied to an antenna 212 to output circularly polarized wave signals. Numeral 31 represents a receiving portion of a sub unit, in which the circularly polarized wave signals output from the transmission portion 21 of the main unit are received by an antenna 311, provided with quadrature phases to an quadrature phase device 312, and separated into the modulated wave P1mod and unmodulated wave CW2. Numeral 4 represents a modem portion of the sub unit, for demodulating the modulated wave P1mod output from the receiving portion 31 of the sub unit to output demodulated data D2r as well as modulating the unmodulated wave CW2 with transmission data D2t of the sub unit to output a modulated wave P2mod. Numeral 32 represents transmission portion of the sub unit, in which the modulated wave P2mod output from the modem portion 4 of the sub unit is input to a quadrature phase device 321, the output of which is applied to an antenna 322 to transmit a circularly polarized wave signal. Numeral 22 represents a receiving portion of the main unit, in which the circularly polarized wave signal output from the transmission portion 32 of the sub unit is received by an antenna 221, and provided with orthogonal phases to a quadrature phase device 222, to output the modulated wave P2mod, and numeral 12 represents a demodulation portion of the main unit, for demodulating the modulated wave P2mod output from the receiving portion 22 of the main unit to output reception data D1r.

In a preferable embodiment, the transmission portion 21 and reception portion 22 of the main unit are one common portion, and the reception portion 31 and transmission portion 32 of the sub unit are also one common portion.

In the RF-ID system of the present invention, the modulation portion 11 of the main unit generates two carrier waves CW1 and CW2, modulates one carrier wave CW1 with external transmission data D1t to output a modulated wave P1mod, and outputs the other carrier wave CW2 as an unmodulated carrier wave, to the transmission portion 21 of the main unit.

The transmission portion 21 of the main unit provides quadrature phases to the modulated wave P1mod and carrier wave CW2 output from the modulation portion 11, and applies them to the transmission antenna from which two circularly polarized wave signals turning in different directions are transmitted to the sub unit.

In the receiving portion 31 of the sub unit, the receiving antenna receives the circularly polarized waves of the modulated wave P1mod and carrier wave CW2 output from the transmission portion 21 of the main unit. The waves are separated in the quadrature phase device into the modulated wave P1mod and unmodulated carrier wave CW2, which are separately output to the modem portion 4 of the sub unit.

The modem portion 4 of the sub unit demodulates the modulated wave P1mod received by and output from the receiving portion 31 of the sub unit to output demodulated data as reception data D2r. The modem portion 4 also modulates the received unmodulated carrier wave CW2 with transmission data D2t of the sub unit to output a modulated wave P2mod to the transmission portion 32 of the sub unit.

The transmission portion 32 of the sub unit provides quadrature phases to the modulated wave P2mod output from the modem portion 4 of the sub unit and applies it to the circular polarizing antenna which transmits a circularly polarized wave signal to the main unit.

In the receiving portion 22 of the main unit, the receiving antenna receives the circularly polarized wave signal output from the transmission portion 32 of the sub unit. The received signal is provided with quadrature phases, and the modulated wave P2mod is separated from the circularly polarized wave signal and output to the demodulation portion 12 of the main unit.

The demodulation portion 12 demodulates the modulated wave P2mod output from the reception portion 22 of the main unit to output demodulated data as reception data D1r.

With the above-mentioned operations, in the RF-ID system of the present invention, the modem portion 4 of the sub unit does not itself generate a carrier wave but uses the carrier wave CW2 received from the main unit to modulate the carrier wave CW2 with the transmission data D2t of the sub unit. The modulated wave P2mod is sent back to the demodulation portion 12 of the main unit via the transmission portion 32 of the sub unit and the receiving portion 22 of the main unit. Therefore, the sub unit consumes less electric power because the sub unit does not include the carrier generators which generate the carrier waves thereby. Since the turning directions of the circularly polarized waves differ, the receiving portion 31 and transmission portion 32 of the sub unit need not be provided with a branching filter, so that the number of the circuits will be reduced. Accordingly, the sub unit will consume less electric power and is more compact; thus solving the above-mentioned problems. If the transmission portion 21 and receiving portion 22 of the main unit are one common portion, and the receiving portion 31 and transmission portion 32 of the sub unit are also one common portion, the size of the system may be further reduced to realize a preferable embodiment.

Figure 3A:
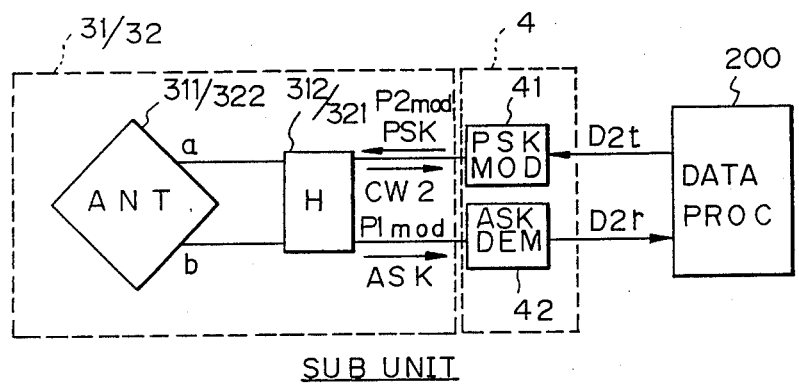
FIGS. 3a and 3b are block diagrams showing the constitution of sub and main units in an RF-ID system of a first embodiment of the present invention.
Figure 3B:
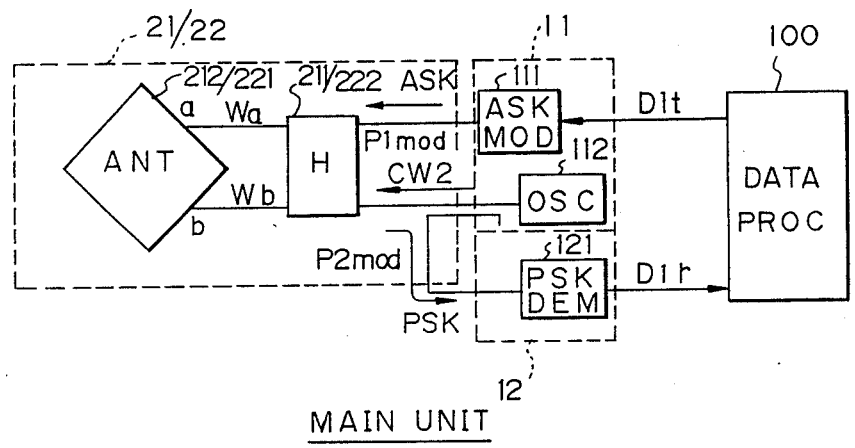
Figure 4:
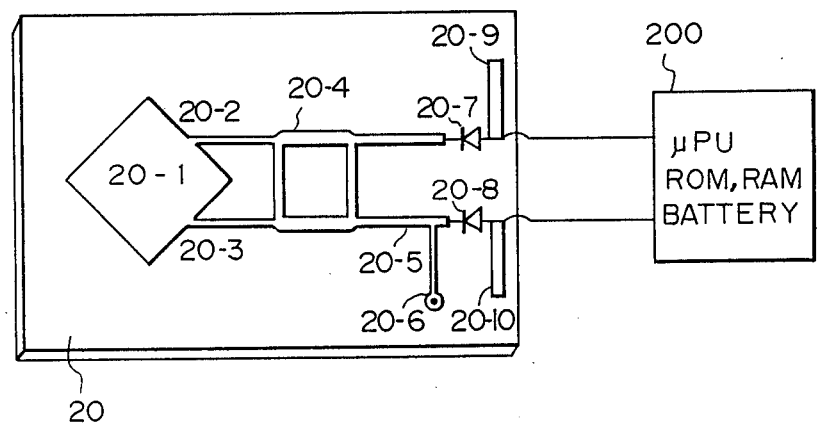
FIG. 4 is a circuit diagram showing the constitution of a sub unit of the RF-ID system of the first embodiment of the present invention.

FIGS. 3a and 3b are block diagrams showing the constitutions of a sub unit and a main unit of an RF-ID system according to a first embodiment of the present invention, and FIG. 4 is a circuit diagram showing the constitution of the sub unit.

In the block diagram of FIGS. 3a and 3b, a modulation portion 11 of the main unit comprises an ASK (Amplitude Shift Keying) modulation oscillator 111 and an unmodulated carrier wave oscillator 112, and a demodulation portion 12 comprises a PSK (Phase Shift Keying) demodulator 121; these elements are formed as one body. A transmission portion 21 and a receiving portion 22 of the main unit comprise one common portion, and a receiving portion 31 and a transmission portion 32 of the sub unit also comprise one common portion.

The ASK modulation oscillator 111 of the modulation portion 11 generates a microwave carrier CW1 which is ASK-modulated with transmission data D1t fed from a data processing portion 100, and outputs an ASK wave as a modulated wave P1mod to the transmission portion 21 of the main unit. The unmodulated carrier wave oscillator 112 generates an unmodulated carrier wave CW2 which is output as it is to the transmission portion 21. The transmission portion 21 of the main unit comprises a hybrid H, i.e., a quadrature phase device 211 and a rectangular patch antenna ANT, i.e., a transmission antenna 212. The quadrature phase device 211 receives the ASK-modulated wave P1mod and unmodulated carrier wave CW2 from the modulation portion 11 and outputs two microwave Wa and Wb having quadrature phases. The microwaves are applied to middle points a and b of two quadrature sides of the rectangular patch antenna ANT, i.e., the transmission antenna 212. The rectangular patch antenna ANT transmits circularly polarized wave signals. For example, the ASK-modulated wave P1mod becomes a right-handed polarized wave and the unmodulated carrier wave CW2 becomes a left-handed polarized wave, and these are transmitted to the reception portion 31 of the sub unit. The reception portion 31 of the sub unit comprises a rectangular patch antenna ANT, i.e., a receiving antenna 311 and a hybrid H, i.e., a quadrature phase device 312; i.e., has the same constitution as that of the transmission portion 21 of the main unit but the signal transmission directions thereof are reversed. The rectangular patch antenna ANT, i.e., the reception antenna 311, receives the right-handed polarized modulated wave P1mod and the left-handed polarized carrier wave CW2 output from the transmission portion 21 of the main unit. The phase of the received waves are shifted in the hybrid H, i.e., the quadrature phase device 312, to separate the received modulated wave P1mod and the received carrier wave CW2 and separately output them to a modem portion 4 of the sub unit.

The modem portion 4 of the sub unit comprises a PSK modulator 41 for carrying out a PSK-modulation and an ASK demodulator 42 for carrying out an ASK demodulation. The ASK demodulator 42 ASK-demodulates the modulated wave P1mod which has been received by the rectangular patch antenna ANT, i.e., the reception antenna 311, and separated by the hybrid H, i.e., the quadrature phase device 312 of the reception portion 31 of the sub unit. Demodulated data D2r is output as reception data to a data processing portion 200. The PSK modulator 41 receives the unmodulated carrier wave CW2 from the hybrid H, i.e., the quadrature phase device 312 of the reception portion 31, and PSK-modulates the unmodulated carrier wave CW2 with transmission data D2t from the data processing portion 200 which comprises a microprocessor, etc., to output a PSK-modulated wave P2mod to the transmission portion 32 of the sub unit. The transmission portion 32 and receiving portion 31 of the sub unit are one common portion. The hybrid H, i.e., an quadrature phase device 321 of the transmission portion 32 of the sub unit, receives the PSK-modulated wave P2mod from the modem portion 4 of the sub unit to output two signals Wa and Wb having phases differing by 90 degrees (90°). The signals Wa and Wb are applied to middle points a and b of two quadrature sides of the rectangular patch antenna ANT, i.e., a transmission antenna 322. Then, the rectangular patch antenna ANT transmits a circularly polarized wave signal. For example, the PSK-modulated wave P2mod is output as a left-handed polarized wave to the reception portion 22 of the main unit.

The reception portion 22 of the main unit is common to the above-mentioned transmission portion 21 of the main unit. The rectangular patch antenna ANT, i.e., a receiving antenna 221 of the receiving portion 22 of the main unit, receives the left-handed polarized wave from the transmission portion 32 of the sub unit, and the hybrid H, i.e., quadrature phase devices 222, outputs the PSK-modulated wave P2mod to the demodulation portion 12 of the main unit.

In the demodulation portion 12 of the main unit, the PSK demodulator 121 PSK-demodulates the modulated wave P2mod with the unmodulated carrier wave CW2 from the modulation portion 11 to output demodulated data as reception data D1r to the data processing portion 100 of the main unit.

In FIG. 4, circuits of the receiving portion 31 (transmission portion 32) and modem portion 4 of the sub unit, except the data processing portion 200, are made of microstrip lines on a single printed board 20. In the circuit of the sub unit shown in FIG. 4, numeral 20-1 represents a rectangular patch antenna used as a transmission and receiving antenna, and 20-2 and 20-3 are impedance matching transmission lines between the rectangular patch antenna 20-1 and a hybrid 20-4, i.e., the orthogonal phase device. Numeral 20-4 represents the hybrid H, i.e., the quadrature branching type phase device, 20-7 a variable-capacitance diode for PSK modulation, 20-8 a microwave detection diode, and 20-9 and 20-10 microwave short-circuit open stubs. A through hole 20-6 on a transmission line 20-5 is a biasing DC return for the diodes 20-7 and 20-8.

As apparent in FIG. 4, the sub unit of the RF-ID system of this embodiment has a circuit constituted by microstrip lines, and therefore, the sub unit is small light weight. The sub unit does not itself generate a carrier wave but uses the unmodulated carrier wave CW2 from the main unit to PSK-modulate it in the variablecapacitance diode 20-7. The modulated wave P2mod is transferred through the hybrid 20-4 of the orthogonal phase device and the impedance matching transmission lines 20-2 and 20-3, and is sent back to the main unit from the rectangular patch antenna 20-1. Since the sub unit does not itself generate the carrier wave, the consumption of electric power by the sub unit is small. Since the reception portion (transmission portion) of the sub unit has the hybrid 20-4, i.e., the quadrature phase device, which is capable of biasing separating circularly polarized wave signals, the frequency branching filter 924 of the conventional system shown in FIG. 1 is not needed. Therefore, the circuit is simple, the power consumption of the sub unit is low, and the sub unit is compact in size, thereby solving the above-mentioned problems. Since the circularly polarized waves are used as radio signal waves between the sub unit and the main unit, the sub unit may be fitted to the moving object regardless of the inclination of the antenna, and therefore, the sub unit can be handled easily.

Figure 5A:
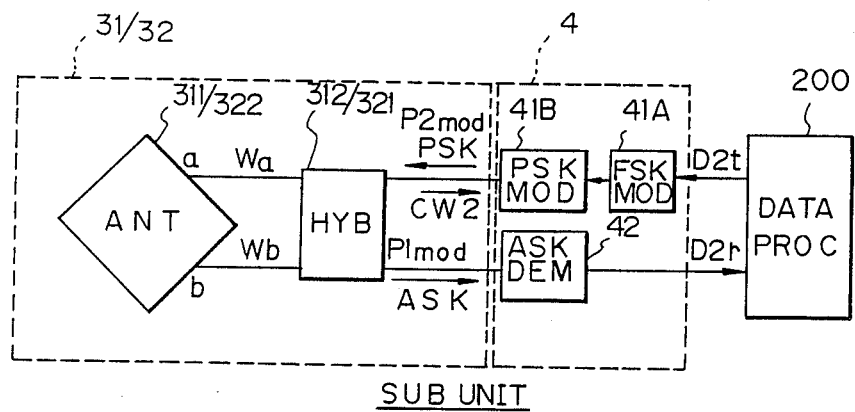
FIGS. 5a and 5b are block diagrams showing the constitution of sub and main units in an RF-ID system of a second embodiment of the present invention.
Figure 5B:
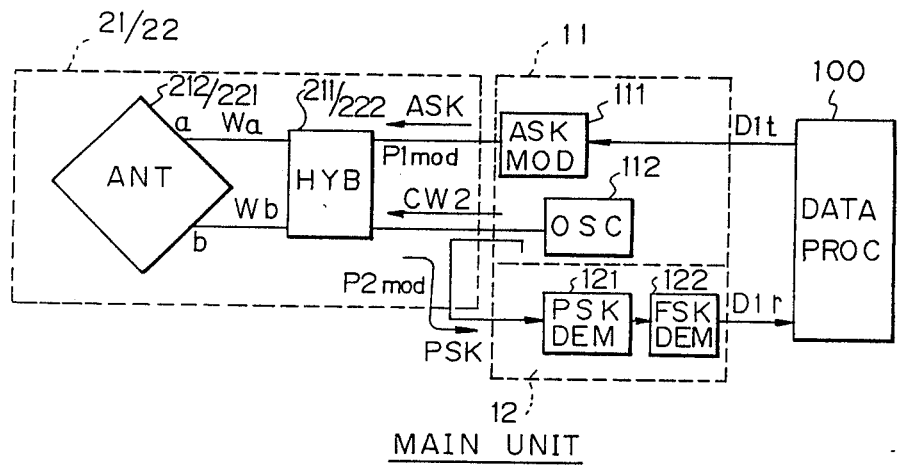

FIGS. 5a and 5b are block diagrams showing the constitution of a microwave communication system according to a second embodiment of the present invention.

In FIGS. 5a and 5b, the difference from the first embodiment is that a demodulating portion 12 of a main unit of the second embodiment has a PSK modulator 121 for high-frequency signals and an FSK demodulator 122 for intermediate-frequency signals. A modulation portion 11 of the main unit comprises, similar to the first embodiment, an ASK modulator 111 for high-frequency signals and an unmodulated carrier wave oscillator 112. A modem portion 4 of a sub unit comprises an FSK modulator 41A for intermediate-frequency signals, a PSK modulator 41B for high-frequency signals, and an ASK demodulator 42 for high-frequency signals.

In the second embodiment of FIGS. 5a and 5b, to improve transmission capacity, data D2t from a data processing portion 200 of the sub unit is not directly input to the PSK modulator 41B for high-frequency signals but the data is converted into an FSK-modulated signal having an intermediate frequency in the FSK modulator 41A for intermediate-frequency signals. Then, the signal is PSK-modulated in the PSK modulator 41B with a received unmodulated high-frequency carrier wave CW2 to obtain a high-frequency PSK wave P2mod.

As a result, in the demodulation portion 12 of the main unit, the PSK demodulator 121 demodulates the high-frequency PSK wave P2mod to regenerate the intermediate-frequency FSK-modulated signal which is FSK-demodulated in the intermediate-frequency FSK demodulator 122. Demodulated data is sent as reception data D1r to a data processing portion 100.

With the arrangement of the second embodiment of FIGS. 5a and 5b, the modem portion 4 of the sub unit does not itself generate a high-frequency carrier wave but uses the carrier wave CW2 received from the main unit to modulate it with the transmission data D2t. The modulated wave P2mod is sent back to the demodulation portion 12 of the main unit via the transmission portion 32 of the sub unit and the reception portion 22 of the main unit. Since the sub unit does not itself generate the high-frequency carrier wave, the power consumption by the sub unit is low. In the reception portion 31 and transmission portion 32 of the sub unit, a hybrid, i.e., a quadrature phase device 312/321, is capable of biasing and separating circularly polarized waves to eliminate conventional frequency branching filters. As a result, the size of the circuit is reduced, electric power consumption of the sub unit is reduced, and the sub unit is made more compact, thus solving the above-mentioned problems.

As explained above, according to the present invention, an RF-ID system comprises a main unit and a sub unit consisting of simple circuits. Therefore, the RF-ID system having a sub unit fitted to a moving object to transmit data which is necessary for production management to the main unit, can be made small, at a low-cost, have a low power consumption, and be easy to handle.

The above sub unit can be placed in radiocommunication with not only the main unit but also a master unit (not shown). In an initial condition, the sub unit can communicate with the master unit to store an ID code for the moving object on which the sub unit is mounted, and production data, in a memory in the data processing unit 200, through the antenna 311/322. In addition, the sub unit can communicate with the main unit therethrough.

Figure 6:
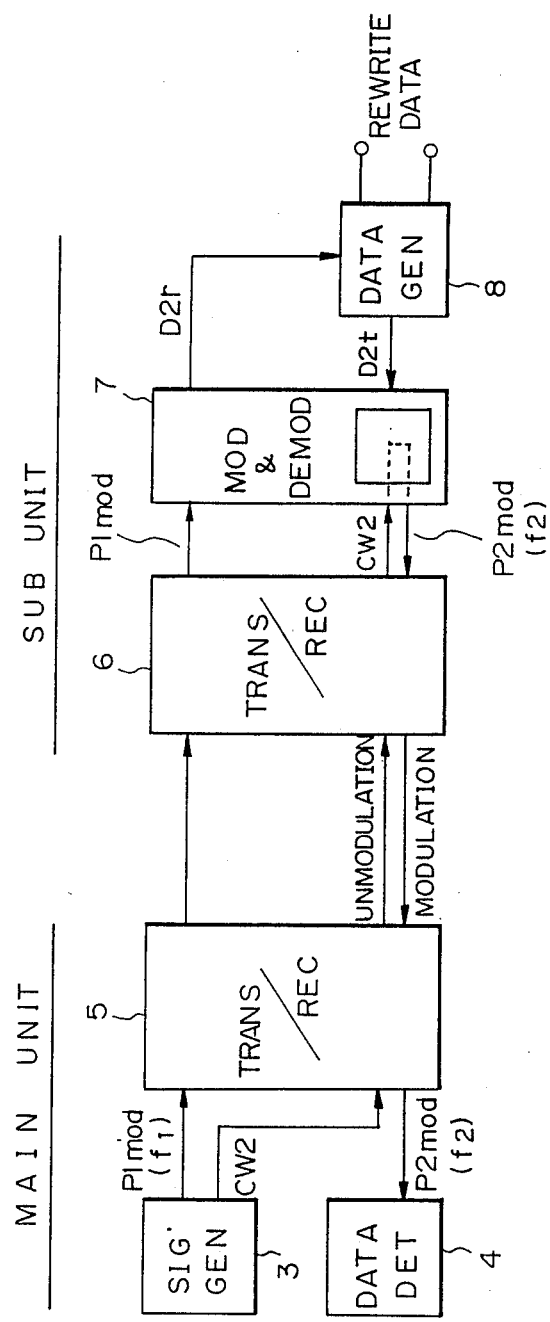
FIG. 6 is a principle block diagram of third and fourth embodiment of an RF-ID system in accordance with the present invention.

A third embodiment of an RF-ID system, a principle block diagram of which is shown in FIG. 6, can be used for an identification system to identify only a person, an object, etc. Here, an ID code is not stored by a radiocommunication as mentioned above, but is stored by, for example, rewriting data into an EEPROM (electrically erasable PROM). In addition, a sub unit therein can not transmit to a main unit, but can be activated by receiving a start signal from the main unit. In the RF-ID system, the circuit construction is further simplified and the power consumption is further reduced.

In FIG. 6, numeral 3 denotes a signal generation circuit for generating an unmodulated wave having a frequency $f_2$ and a wave having a frequency $f_1$; numeral 5 denotes a transmission-reception circuit of a main unit for receiving outputs from the signal generation means through corresponding terminals, transmitting them as circularly polarized waves turning in opposite directions, receiving a modulated wave having a frequency $f_2$, and outputting the same from the terminal through which the unmodulated wave was input; and numeral 4 denotes a data detection means for demodulating the modulated wave of frequency $f_2$ output from the transmission-reception circuit of the main unit to detect data.

Numeral 6 denotes a transmission-reception circuit of a sub unit of the same constitution as that of the transmission-reception circuit of the main unit, for receiving the unmodulated wave having a frequency $f_2$ and the wave having a frequency $f_1$, separately outputting them from corresponding terminals, receiving a modulated wave having a frequency $f_2$, and transmitting the same as a circularly polarized wave having the same turning direction as that of the unmodulated wave having a frequency $f_2$. Numeral 7 denotes a modulation and detection circuit for detecting the wave having a frequency $f_1$ output from the transmission-reception circuit 6 of the sub unit to send a detected output, and changing the phase of the unmodulated wave having a frequency $f_2$ depending on data to be input to generate a modulated wave having a frequency $f_2$. Numeral 8 denotes a data generation portion to be actuated by the detected output from the modulation and detection circuit 7, the written data of which is read out or renewed externally.

Figure 7:
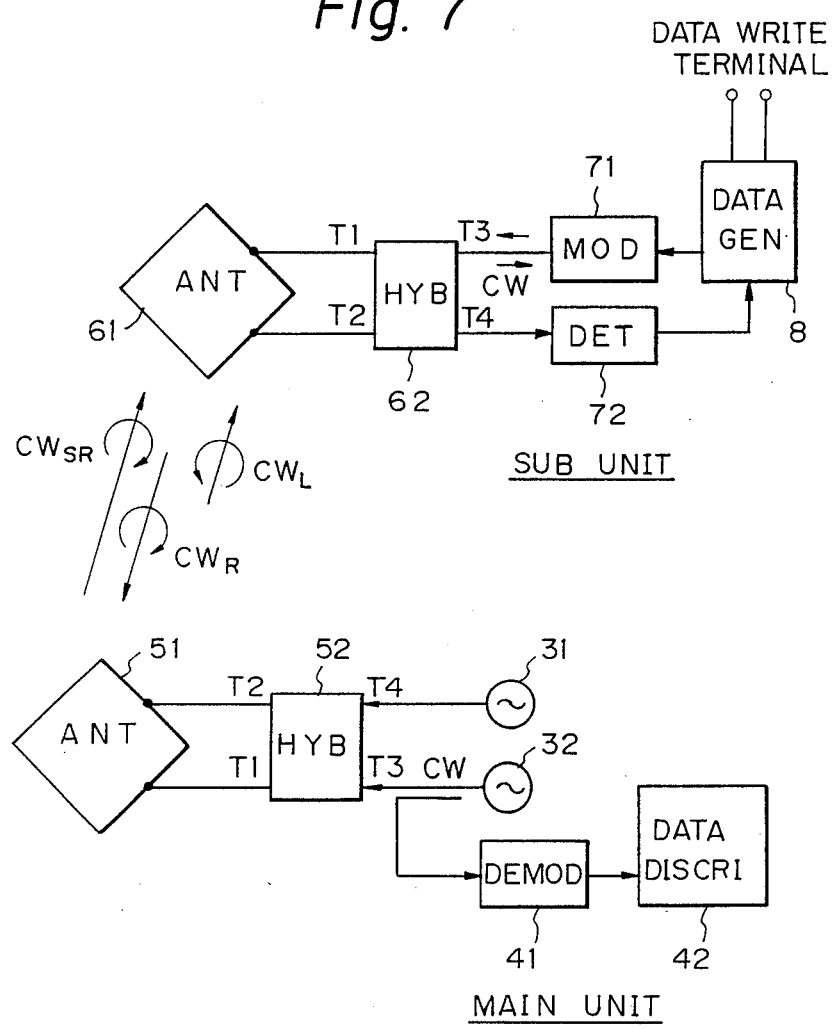
FIG. 7 is a block diagram of a third embodiment of the present invention.
Figure 8:
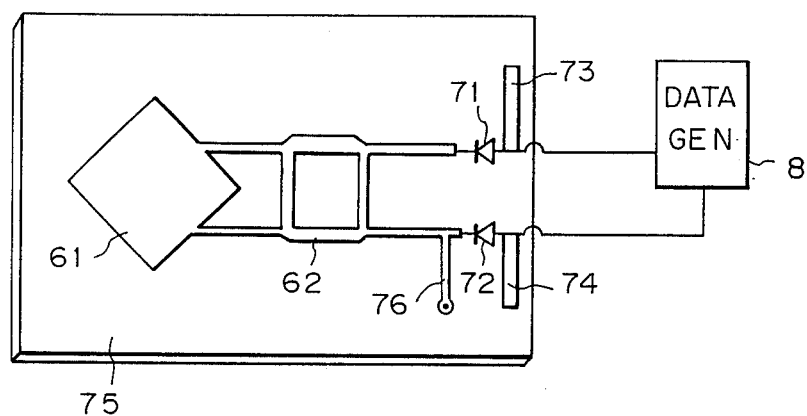
FIG. 8 is a circuit diagram showing an example of the constitution of a sub unit of FIG. 7.

FIG. 7 is a diagram showing a third embodiment of the present invention, and FIG. 8 is a view showing an example of the constitution of a sub unit of FIG. 7.

A starting microwave oscillator 31 and an unmodulated microwave oscillator 32 constitute the signal generation circuit 3, and a demodulator 41 and a data discriminator 42 constitute the data detection circuit 4. The main unit antenna 51 and a 90° hybrid circuit 52 constitute the transmission-reception circuit 5 of the main unit, a sub unit antenna 61 and a 90° hybrid circuit 62 constitute the transmission-reception circuit 6 of the sub unit, and a modulator 71 and a detector 72 constitute the modulation and detection circuit 7.

An operation of the RF-ID system shown in FIG. 7 will be explained based on the assumption that a starting microwave is a right-hand polarized wave and an unmodulated microwave is a left-hand polarized wave.

First, the starting microwave oscillator 31 and the unmodulated microwave oscillator 32 of the main unit output a starting microwave and an unmodulated microwave (hereinafter referred to as the CW), respectively. The microwaves are applied to a terminal T4 and a terminal T3 of the 90° hybrid circuit 52, respectively.

Terminals T1 and T2 isolated from the 90° hybrid circuit 52 are connected to power supply points of the main antenna 51, which is a square vertical and horizontal dual antenna. Therefore, the starting microwave input from the terminal T4 is output from the terminals T2 and T1 and synthesized in the vertical and horizontal dual antenna into a right-hand polarized wave as shown in the figure.

The CW input from the terminal T3 is output from the terminals T1 and T2 and transmitted as a left-hand polarized wave to the sub unit, as shown in the figure. The starting microwave and the CW have relatively close frequencies.

The antenna 61 and 90° hybrid circuit 62 of the sub unit have the same constitutions and characteristics as those of the antenna and 90° hybrid circuit of the main unit. With the combination, without using branching filters, etc., the starting microwave and CW are distributed in the sub unit such that the starting microwave is output from the terminal T4 and the CW from the terminal T3. The former is detected by the detector 72, and a detected output is applied to the data generation portion 8 to actuate the same, which is usually in a rest state, so that internal data may be generated and transmitted to the modulator 71.

On the other hand, the latter is applied to the modulator 71. As shown in FIG. 8, the capacitance of a diode, for example, a capacitance-variable diode 71, constituting the modulator is changed in response to the data from the data generation portion 8. Therefore, when the input CW is reflected by the diode, the phase thereof is changed to generate a modulated wave having a frequency $f_0$, which is transmitted via the hybrid circuit 62, sub unit antenna 61 and main unit antenna 51. The modulated wave is output from the terminal T3 of the 90° hybrid circuit 52, demodulated in the demodulator 41, and discriminated in the data discriminator 42 to provide data. The data written in the data generation portion 8 can be renewed by using data renewing terminals.

The constitution of the sub unit which operates as mentioned above is shown in FIG. 8. Except for the data generation portion 8, the sub unit antenna 61, 90° hybrid circuit 62, modulator 71, and detector 72 are formed of microstrip lines on a printed board 75. The sub unit antenna 61 is a square transmission-reception dual antenna called a patch antenna. The transmission line between the antenna and the 90° hybrid circuit 62 is for impedance matching. Numerals 73 and 74 are microwave short-circuiting open stubs, and 76 is a biasing DC return.

Figure 9:
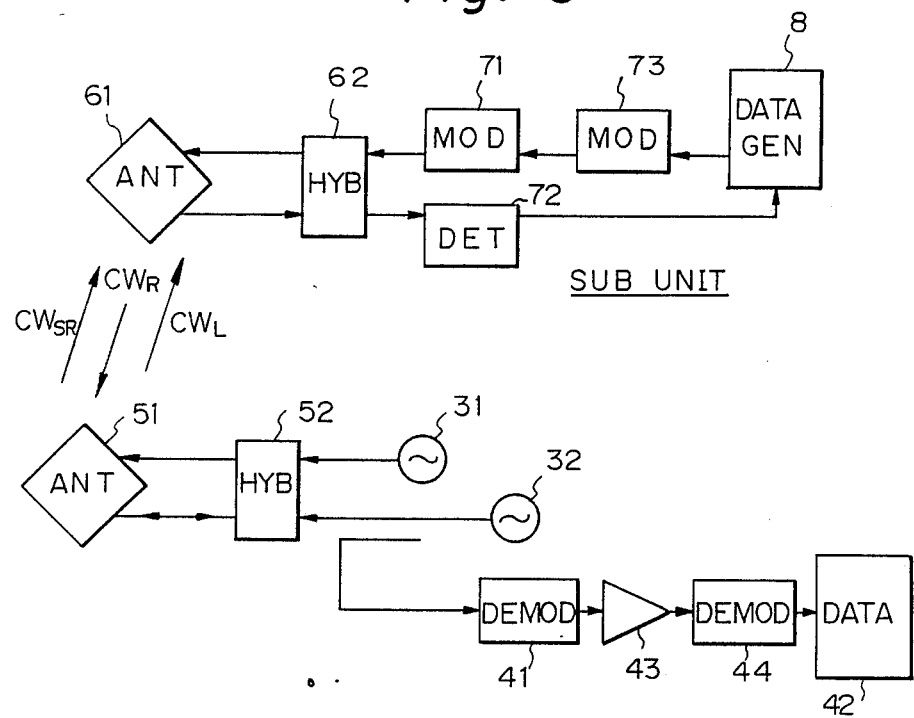
FIG. 9 is a block diagram of a fourth embodiment of the present invention.

FIG. 9 is a diagram of a fourth embodiment of the present invention, which is a modification of the third embodiment. In FIG. 7, data from the data generation portion 8 is directly input to the microwave modulator 71. In FIG. 9, to improve a reception sensitivity of the main unit, data from the data generation portion 8 is used to obtain a modulated wave in an intermediate frequency band in a second modulator 73, and then the modulated wave is used to modulate a microwave in a first modulator 71.

In the main unit, a first demodulator 41 demodulates the modulated wave in an intermediate frequency band, and an intermediate frequency amplifier 43 amplifies a demodulated wave. Then, data is picked up in a data discrimination portion 42 after a second demodulator 44.

As described above, the sub units of the embodiments of the present invention have circuits constituted by microstrip lines. The right-hand and left-hand polarized waves are separated by the combination of the vertical and horizontal dual antenna and 90° hybrid circuit without using branching filters, and therefore, the circuits are light and compact.

Further, the main unit sends a starting signal to actuate the data generation portion which generates data. The variable-capacitance diode, whose capacitance varies according to data, is used to change a reflected phase of the received CW to be sent back to the main unit so that power consumption of the sub unit is reduced.

Since circularly polarized waves are used, the inclinations of antennas can be disregarded when fitting the sub unit to a moving body.

As described above in detail, according to the third and fourth embodiments of the present invention, the sub unit can be made further reduced small and have a further reduced low power consumption, and when fitting the sub unit to a moving body, the inclination of the sub unit can be disregarded.

Still other embodiments of the present invention, in which null point phenomenon is eliminated, will be described.

Figure 10:
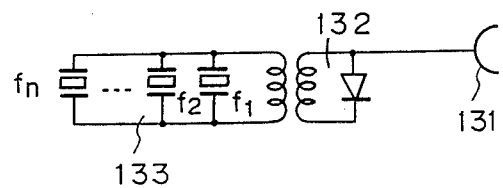
FIG. 10 is a circuit diagram of a prior art RF-ID system.
Figure 10:
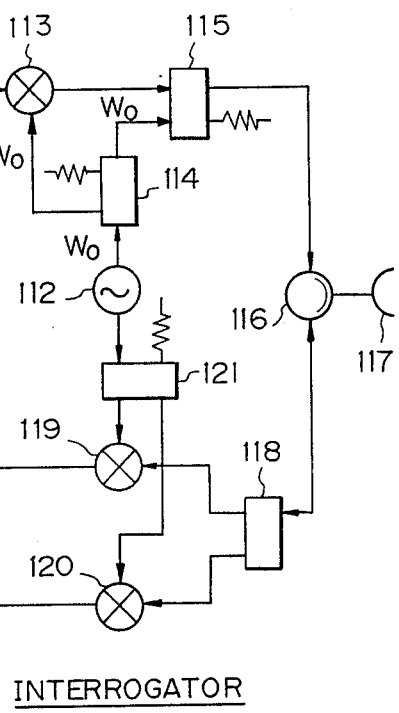

A constitution which may prevent the occurrence of a null-point has been disclosed in JPA No. 53-18109 entitled "Object Discriminating Apparatus" and published on Feb. 20, 1978. A prior art example shown in the diagram of FIG. 10 was disclosed in JPA No. 53-18109, and since the detailed description of the same can be obtained from that publication, only a brief explanation of the operation of the apparatus will be given.

First, an interrogator (corresponding to the main unit mentioned above) is disposed in the vicinity of a path of travel of a moving object, and a transponder (corresponding to the sub unit mentioned above) is disposed on an object such as the moving object to be identified. Then, a frequency sweep wave generator 111 of the interrogator generates a frequency sweep wave signal $W_s$, and a carrier wave generator 112 generates a carrier wave signal $W_0$. A frequency mixer 113 mixes the signals to produce a signal $W_0 \pm W_s$, and the signal $W_0 \pm W_s$ is synthesized with the signal $W_0$ in a coupler 115 and transmitted as an interrogation signal to the outside via a transmission-reception switch 116 and an antenna 117. An antenna 131 of the transponder receives the interrogation signals $W_0 \pm W_s$ and $W_0$, and a mixing circuit 132 comprising nonlinear elements demodulates the signal $W_0 \pm W_s$ to obtain the signal $W_s$ which is applied to a resonant circuit 133. The resonant circuit comprises a plurality of resonant elements connected in parallel and each having a high Q-value. The resonant elements have resonant frequencies $f_1$ to $f_n$, respectively.

When the signal $W_s$ is applied to the resonant elements, resonant signals $W_1$ to $W_n$, i.e., ringing signals corresponding to the transponder, are obtained. The ringing signals are modulated with the signal $W_0$ in the mixing circuit 132, and answer signals $W_0 \pm W_1$ to $W_0 \pm W_n$ are transmitted to the outside via the antenna 131.

The answer signals are passed through the antenna 117 and transmission-reception switch 116, distributed in an in-phase distributor 118 of the interrogator, and applied to mixers 119 and 120.

To the mixers, carrier signals $W_0$ having phases differing by 90° are applied from the carrier signal generator via a 90° phase difference distributor/21. The signals are mixed, and the ringing signals $W_1$ to $W_n$ are demodulated. These signals are then mixed with the signals $W_s$ in mixers 122 and 123, to pick up ringing signal components $W_s - W_0$ to $W_s - W_n$ which are squared in squaring devices 124 and 125 to obtain ringing double wave response components $2(W_s - W_0)$ to $2(W_s - W_n)$ via an adder 126 and a filter (not shown).

By reading the positions of the double wave response components on a sweep time axis, an identification operation is achieved without the occurrence of a null-point.

The received answer signals, however, are distributed and mixed with the signals $W_0$ having phases differing by 90°, again mixed with the signals $W_s$, then squared and added, thus complicating the circuitry necessary for eliminating the null-point phenomenon.

Figure 11:
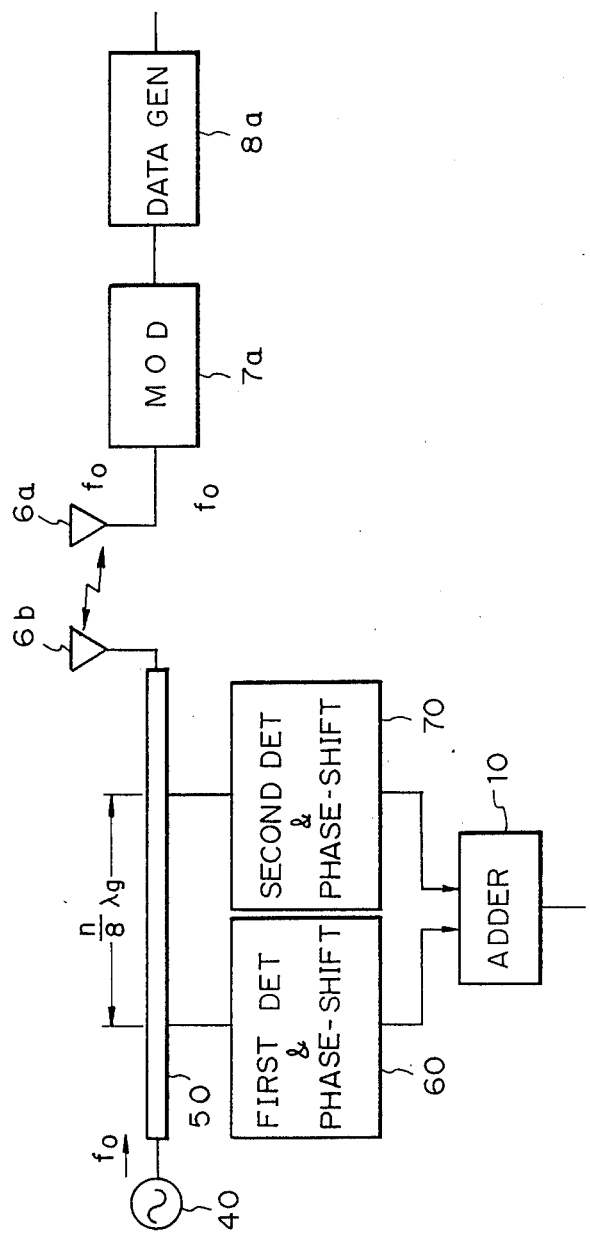
FIG. 11 is a principle block diagram of a fifth embodiment of an RF-ID system in accordance with the present invention.

FIG. 11 is a principle block diagram of a fifth embodiment of an RF-ID system in accordance with the present invention.

In the figure, numeral 8a represents a data generation portion for generating data, 7a represents modulator for modulating an input unmodulated wave having a frequency $f_0$ with an output of the data generation portion and returning a modulated wave, and 40 represents an unmodulated wave generator for generating the unmodulated wave having a frequency $f_0$. Numerals 60 and 70 represent first and second detection and phase shift circuits, respectively, which are connected to two points distanced by about n/8 of a wavelength ($\lambda$) on a transmission line 50 for connecting the unmodulated wave generator to a main unit antenna 6b. Note, n is an odd integer (n=1, 3, 5, ...). The first and second detection and phase shift circuits 60 and 70 detect mixed waves of the unmodulated wave having a frequency $f_0$ and modulated wave having a frequency $f_0$ that are input through the transmission line, pick up detected outputs, and shift the detected outputs so that the phase difference between the two detected outputs will be a predetermined value. A numeral 10 is an adder portion for adding outputs of the first and second detection and phase shift means.

As shown in FIG. 11, the unmodulated wave generator 40 of the main unit sends an unmodulated wave having a frequency $f_0$ to the sub unit through the transmission line 50 and antenna 6b of the main unit. The modulator 7a of the sub unit modulates the input unmodulated wave with data from the data generation portion 8a and returns a modulated wave to the main unit. In the main unit, the first detection and phase shift circuit 60 and the second detection and phase shift circuit 70 are connected to two points distanced by about n/8 of a wavelength on the transmission line 50 connecting the antenna 6b to the unmodulated wave generator 46. These means 60 and 70 mix and detect detection waves so that one of the means 60 and 70 generates a maximum detected output when the other is on a null-point.

The phases of two detected outputs are shifted at corresponding shift portions to make the phase difference a predetermined value. Then, the outputs are added in the adder 10 so that a null-point does not occur even if a distance between the sub unit antenna $A_2$ and the main unit antenna $A_1$ is changed, as described below.

To simplify calculations, in the sub unit, an unmodulated wave is ASK-modulated (ASK for "amplitude shift keying"), i.e., AM-modulated with data, but other modulation techniques may be adopted to realize the same effect.

As is known, an AM-modulated wave is expressed as follows:

$$\sin \omega_0 t + A \sin(\omega_0 + \Delta\omega)t + A \sin(\omega_0 - \Delta\omega)t.$$

By mixing the AM-modulated wave with the unmodulated wave $\sin(\omega_0 t + \phi)$, the following formula (1) is obtained:

$$\sin \omega_0 t \cdot \sin(\omega_0 t + \phi) + A \sin(\omega_0 + \Delta\omega)t \cdot \sin(\omega_0 t + \phi) + A \sin(\omega_0 - \Delta\omega)t \cdot \sin(\omega_0 t + \phi) \quad (1)$$

where, $\sin \omega_0 t$ is the unmodulated wave, $\cos \Delta\omega$ the modulated signal, and $\phi$ a phase difference between the modulated signal and the unmodulated signal.

In the formula (1), the first term provides only a double wave and a DC component, the second term provides the double wave and $(\frac{1}{2})A \cos(\Delta\omega t + \phi)$, and the third term provides the double wave and $(\frac{1}{2})A \cos(-\Delta\omega t + \phi)$. By picking up a modulated signal component with a low-pass filter, the following detected output is obtained:

$$(\tfrac{1}{2})A \cos(\Delta\omega t + \phi) + (\tfrac{1}{2})A \cos(-\Delta\omega t + \phi) \quad (2)$$

By rearranging this equation, the following formula is obtained:

$$A \cos \phi \cdot \cos \Delta\omega t \quad (3)$$

According to this formula (3), zero will be obtained in accordance with the value $\phi$, to present a null-point, or a phase opposite to that of the modulated signal will appear.

Figure 12A:
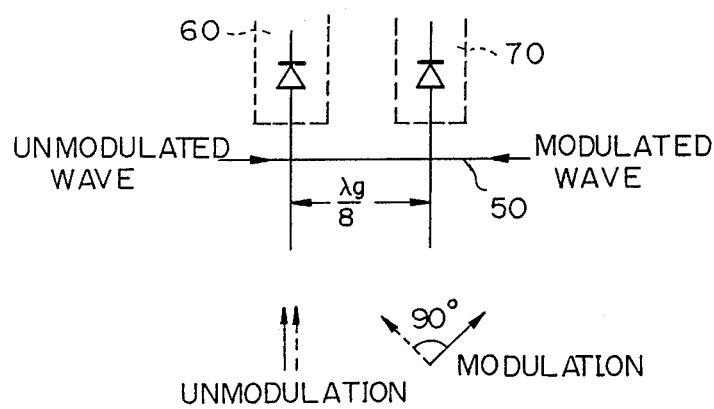
FIGS. 12a and 12b are explanatory views of an operation of the RF-ID system shown in FIG. 11.

Next, as shown in FIG. 12a, the first detection and phase shift circuit 60 and the second detection and phase shift circuit 70 are arranged at the two points distanced by $\frac{1}{8}$ of a wavelength (n being 1) on the transmission line 50. The unmodulated wave and modulated wave are input from both sides of the transmission line. If the phases of the unmodulated wave and modulated wave input into the first detection and phase shift circuit 60 coincide, the phase of the unmodulated wave is delayed by 45°, and the phase of the modulated wave advances by 45°, on the inputs of the second detection and phase shift circuit 70 so that the phase difference between the two waves will be 90°.

Figure 12B:
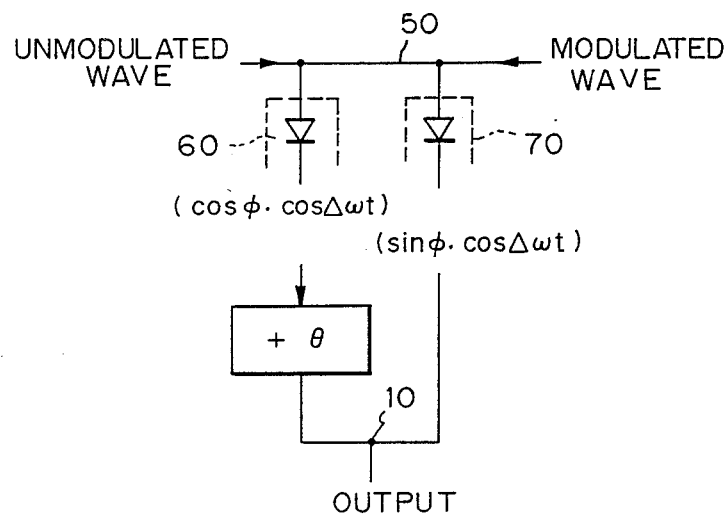

Further, as shown in FIG. 12b, when a phase shift amount of the first detection and phase shift means 60 is larger by $\theta$ than a phase shift amount of the second detection and phase shift circuit 70, and when the outputs of the detection and phase shift circuit 60 and 70 are added, the following formula (4) is obtained:

$$\cos \phi \cdot \cos(\Delta\omega t + \theta) + \sin \phi \cdot \cos \Delta\omega t \quad (4)$$

For simplicity, it is assumed that $\theta=90°$. Then, a formula (4) will be obtained as follows:

$$\sin(\phi - \Delta\omega t) \qquad (5)$$

Accordingly, $\phi$ comes in the phase term of a modulated signal so that an amplitude of the synthesized output will be constant even if $\phi$ changes, thus avoiding the occurrence of a null-point. If $\phi \neq 90°$ and not $\theta=0$, the amplitude will not be constant but does not reach 0, so that the null-point will not occur. Namely, with a simple circuit constitution, the occurrence of null-point phenomenon will be avoided.

Figure 13:
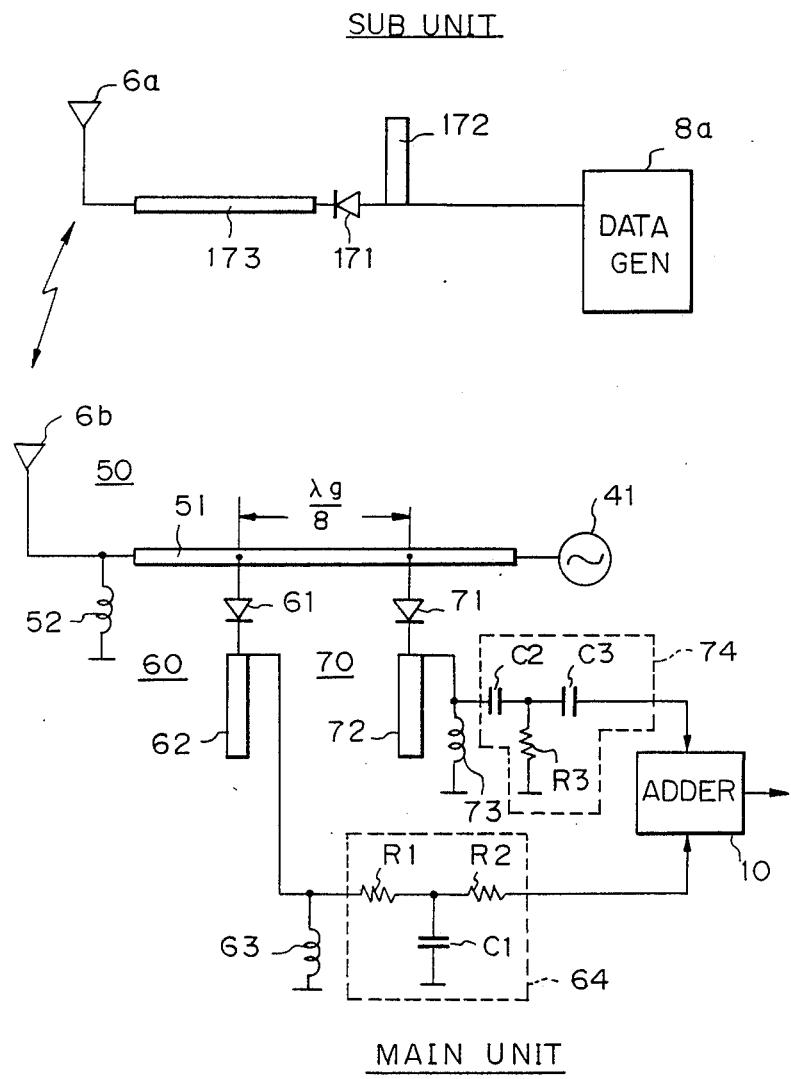
FIG. 13 is a circuit diagram of a fifth embodiment of the RF-ID system in accordance with the present invention.

FIG. 13 is a diagram of the fifth embodiment of the present invention.

In the figure, a transmission line portion 51 and a choke coil 52 constitute the transmission line 50. A detection diode 61 and a quarter wavelength ($\lambda g/4$) open stub 62, where $\lambda g$ represents an effective wave length, a choke coil 63, and a low-pass filter 64 constitute the first detection and phase shift circuit 60. A detection diode 71, a quarter wavelength open stub 72, a choke coil 73, and a high-pass filter 74 constitute the second detection and phase shift circuit 70. A transmission line portion 173, a modulation diode 171 and a quarter wavelength open stub 172 constitute the modulator 7a.

An operation of the RF-ID system shown in FIG. 13 will be explained for a case in which n=1, the magnitude of a detected output of the low-pass filter 64 is the same as that of a detected output of the high-pass filter 74, and a phase difference is 90°.

First, an unmodulated wave in a microwave band from a microwave oscillator 41 of a main unit is passed through the transmission line portion 51 and radiated from the antenna 6b. The radiated wave passes through the antenna 6a and the transmission line portion 173 of a sub unit and is applied to the modulation diode 171, which is microwave-short-circuited by the quarter wavelength open stub 172. Since the received wave is totally reflected or short-circuited by the diode 171, depending on the output of the data generation portion 8a, the unmodulated wave is amplitude-modulated and sent back as a modulated wave to the main unit.

In the main unit, the modulated wave is applied via the transmission line portion 51 to the detection diodes 61 and 71, which are spaced by one-eighth of a wavelength. Microwaves from the microwave oscillator are also applied to the detection diodes, and therefore, the waves are mixed and detected. The detected outputs are passed through the low-pass filter 64 and high-pass filter 74 to provide two data signals, and at this time, the phase of the data signal is shifted by, for example, +45°, in the low-pass filter, and the phase of the data signal is shifted by −45° in the high-pass filter, to provide data signals having a phase difference of 90°. The data signals are added in the adder 10 to provide data not having a null-point.

$R_1$, $R_2$ and $C_1$ constitute the low-pass filter, and $C_2$, $C_3$ and $R_3$ constitute the high-pass filter; these elements have substantially the same insertion loss.

Figure 14:
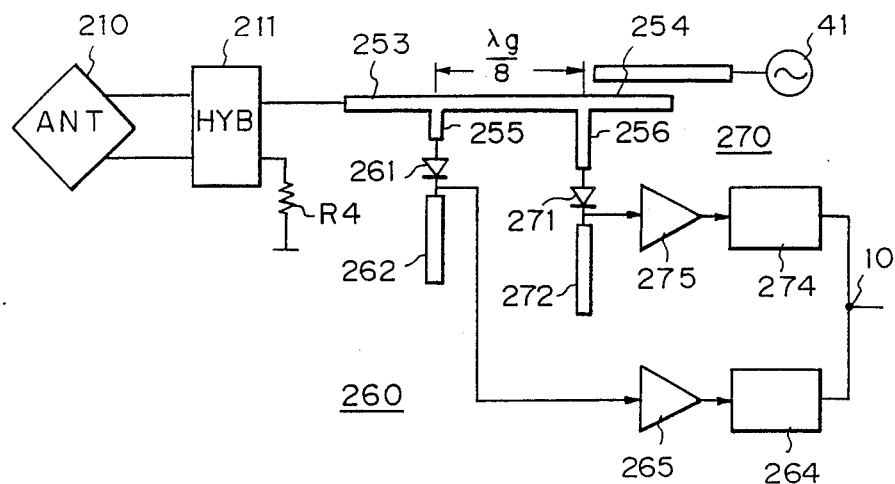
FIG. 14 is a block diagram of a sixth embodiment of a main unit of the present invention; and, FIG. 15 is a block diagram of a seventh embodiment of the present invention.

FIG. 14 is a diagram showing a sixth embodiment of the main unit of the present invention, in which like reference marks represent like parts.

In the figure, a microwave oscillator 41 is connected to a transmission line portion 253 and a connection line portion 254. The transmission line portion 253 is connected to vertical and horizontal power supply terminals of a rectangular patch antenna 210 via a 90° hybrid circuit 211 so that circularly polarized waves are transmitted from the sub unit. Accordingly, the fitting requirements of the sub unit with respect to a moving object can be relaxed.

A first detection and phase-shift circuit 260 comprises the elements 261 to 264, and a second detection and phase-shift circuit 270 comprises the elements 271 to 274. Detection diodes 261 and 271 are connected to the transmission line portion 253 through transmission line portions 255 and 256 having different lengths respectively, as shown in the figure. Further, detected outputs are amplified in amplifiers 265 and 275, passed through a low-pass filter 264 and a high-pass filter 274, and added by an adder 10 to provide data.

Figure 15:
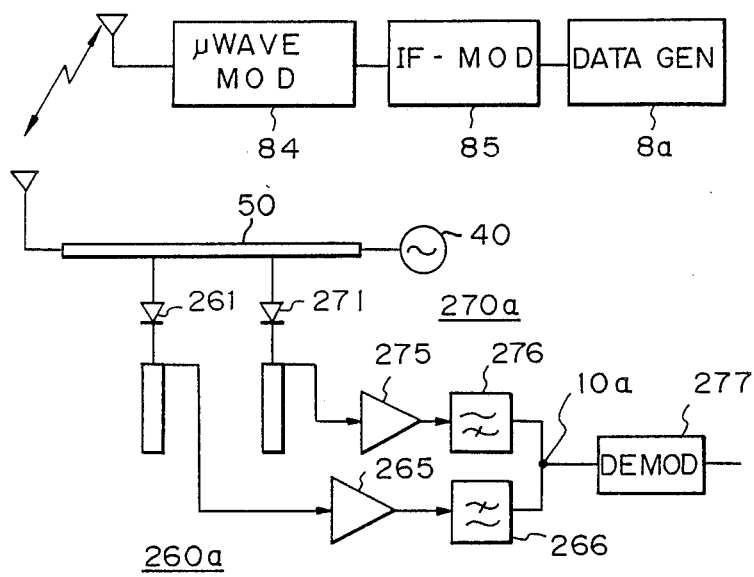

FIG. 15 is a diagram showing a seventh embodiment of the present invention. In the embodiments shown in FIGS. 13 and 14, data from the data generation portion 8a of the sub unit is used to directly modulate an unmodulated wave in a microwave band. But, in FIG. 15, the data is converted into a modulated wave in an intermediate frequency band in an intermediate-frequency-band modulator 85, and the modulated wave is used in a microwave-band modulator 84 to modulate a received unmodulated wave in a microwave band to send a modulated microwave back to the main unit.

In FIG. 15, numeral 85 denotes an intermediate-frequency-band modulator for converting an output of the data generation portion into a modulated wave in an intermediate frequency band, and 84 is a microwave-band modulator for modulating the unmodulated wave having a frequency $f_0$ to return a modulated wave. Numeral 277 is a demodulator for demodulating an output of the adder.

In FIG. 15, data from the data generation portion 8a in the sub unit is converted into a modulated wave in an intermediate frequency band in the intermediate-frequency-band modulator 85. The microwave-band modulator 84 uses the modulated wave to modulate an unmodulated wave in a microwave band and send a modulated microwave back to the main unit. The main unit detects the modulated microwave by first and second detection and phase shift circuits 260a and 270a to pick up the modulated wave in the intermediate frequency band, adds it in the adder 10a, and demodulates it in the demodulator 277. Accordingly, the data can be picked up even at a low reception level.

In this case, the detected outputs of detection diodes 261 and 271 of the main unit are the modulated signals of the intermediate frequency band. These signals are amplified in intermediate frequency amplifiers 265 and 275, passed through a low-pass filter 266 and a high-pass filter 276, and added in an adder 10a. An added output is demodulated in an intermediate-frequency-band demodulator 277 to provide data. Since the main unit carries out the intermediate frequency amplification, the data can be picked up even if the reception level is low.

In the embodiments of FIGS. 13 to 15, diodes are used as the detectors, but non-linearly operating elements such as transistors, field effect transistors, etc., also may be used.

Although a low-pass filter and high-pass filter are used as the phase shift circuit, one of the filters may be omitted to shift the phase by 90°, if a lower performance level is allowable. In this case, a level difference may occur in detected outputs before they are added, so that an added amplitude may vary. Nevertheless, the null-point does not occur.

Since the microwave-band circuits can be constituted with microstrip lines, they may be made compact and light, and thus their structures can be simplified.

Many widely different embodiments of the present invention may be constructed without departing from the spirit and scope of the present invention. It should be understood that the present invention is not limited to the specific embodiments described in this specification, except as defined in the appended claims.

We claim:

1. A radio frequency identification system, comprising:
   a main unit, comprising:
      a main modem portion outputting a first modulation signal generated by modulating a first carrier having a first frequency with a first transmission data, a second carrier having a second frequency close to said first frequency, a starting modulation signal generated by modulating the first carrier with start data;
      a main transmission portion, operatively connected to said main modem portion, receiving the first modulation signal and the second carrier and generating a first circularly polarized wave having a first rotation, based on the first modulation signal, a second circularly polarized wave having a second rotation opposite to the first rotation, based on the second carrier and a starting circularly polarized wave, having the second rotation based on the starting modulation signal and the second carrier for initiating communication; and
      a main reception portion, operatively connected to said main transmission portion, receiving a second circularly polarized wave and outputting a second modulation signal; and
   a sub unit, radio communicatable with said main unit through a radio-communication channel, comprising:
      a small size battery;
      a sub reception portion, operatively connected to said small size battery, receiving the first circularly polarized wave and separating the first circularly polarized wave into the first modulation signal and the second carrier;
      a sub transmission portion, operatively connected to said small size battery, generating the second circularly polarized wave having a rotation equal to the first rotation on the basis of the second modulation signal;
      a sub modem portion including
         a sub modulation portion, operatively connected to said sub transmission portion and said small size battery, but not supplied with power from said small size battery in a normal state; and
         a sub demodulation portion, operatively connected to said sub reception portion, for demodulating the first modulation signal, detecting the starting circularly polarized wave and triggering said sub modulation portion in response to a reception of the starting circularly polarized portion, said main modem portion demodulating said second modulation signal to recover said second transmission data.

2. A radio frequency identification system according to claim 1, wherein said power supplied from said battery to said sub modulation portion is stopped after completion of a data transmission from said sub unit.

3. A radio frequency identification system according to claim 2,
   wherein said sub unit further comprises a data processing portion, operatively connected to said small sized battery, said sub demodulation portion and said sub modulation portion, for receiving said first transmission data and supplying said second transmission data, and
   wherein said data processing portion is supplied with power from said battery when said starting circularly polarized wave is received and is not supplied with power after completion of said data transmission from said sub unit.

4. A radio frequency identification system according to claim 1, wherein said second transmission data comprises an identification code stored in said data processing portion.

5. A radio frequency identification system according to claim 4, wherein said sub unit is mounted on a moving object and transmits the identification code of said object previously stored in said data processing portion.

6. A radio frequency identification system according to claim 1, wherein said first and second frequencies are within approximately 0.1 to several tenths gigahertz of each other.

7. A radio frequency identification system according to claim 6, wherein said main modem portion comprises an amplitude shift keying modulator operatively connected to said main transmission portion.

8. A radio frequency identification system according to claim 7, wherein said main transmission portion comprises a first printed hybrid circuit operatively connected to said main modem portion and a first printed antenna operatively connected to said first printed hybrid circuit.

9. A radio frequency identification system according to claim 6, wherein said sub reception portion comprises a second printed hybrid circuit operatively connected to said sub modulation/demodulation portions and a second printed antenna operatively connected to said second printed hybrid circuit.

10. A radio frequency identification system according to claim 7,
    wherein said sub modem portion comprises a phase shift keying modulator operatively connected to said sub reception/transmission portions, and
    wherein said main modem portion comprises a phase shift keying demodulator operatively connected to said main transmission portion.

11. A radio frequency identification system according to claim 10, wherein said sub transmission portion comprises a second printed hybrid circuit operatively connected to said sub modulation/demodulation portions, and a second printed antenna operatively connected to said second printed hybrid circuit, said second printed antenna and said second printed hybrid circuit being commonly used with said sub reception portion.

12. A radio frequency identification system according to claim 11, wherein said main reception portion comprises a first hybrid circuit operatively connected to said main modem portion and a first printed antenna operatively connected to said first hybrid circuit, said first printed antenna and said first printed hybrid circuit being commonly used with said main transmission portion.

13. A radio frequency identification system according to claim 7,
wherein said sub modem portion comprises a frequency shift keying modulator and a phase shift keying modulator connected in series, and
wherein said main modem portion comprises a phase shift keying demodulator and a frequency shift keying demodulator connected in series.

14. A radio frequency identification system according to claim 6, further comprising a data processing portion, operatively connected to said sub modem portion, for receiving said first transmission data and outputting said second transmission data.

15. A radio frequency identification system according to claim 14, wherein said sub unit is radio communicatable to a master unit for providing said second transmission data to be stored in said data processing portion.

16. A radio frequency identification system according to claim 1,
wherein said main modem portion comprises a signal transfer means for transmitting signals having a phase, a first detection and phase-shift means for detecting the signals and shifting the phase thereof, a second detection and phase-shift means for detecting the signals and shifting phase thereof, and a signal adding means for adding signals from said first and second detection and phase-shift means, and
wherein said first and second detection and phase-shift means connected to said signal transfer means and spaced apart by $(\lambda g/8)n$, where $\lambda g$ is an effective wave length of said carrier, and n is an odd integer.

17. A radio frequency identification system according to claim 1, wherein said sub unit is mounted on a moving object, and said main unit is installed at a fixed position.

18. A radio frequency identification system according to claim 17, wherein said system enables management of the moving object within a production line.

19. A radio frequency identification system according to claim 18,
wherein said sub unit further comprises a data processing portion, operatively connected to said sub modem portion, for receiving said first transmission data and outputting said second transmission data, and
wherein said data processing portion stores an identification code and production data for the moving object.

20. A radio frequency identification system, comprising:
a sub unit, including a sub reception portion, a sub modem portion, a sub transmission portion, and a small size battery supply power to said sub reception portion, said sub modem portion and said sub transmission portion; and
a main unit, radio communicatable with said sub unit through a radio communication channel, including a main transmission portion, a main reception portion and a main modulation/demodulation portion operatively connected to said main transmission and reception portions, comprising:
signal transfer means for transmitting signals having a phase;
first detection and phase-shift means, operatively connected to said signal transfer means, for detecting the signals and shifting the phase thereof, comprising a low-pass filter shifting the phase of the signals by $+45°$;
second detection and phase-shift means, operatively connected to said signal transfer means, for detecting the signals and shifting the phase thereof, comprising a high-pass filter shifting the phase of the signals thereto by $-45°$; and
signal adding means for adding the signals detected by said first and second detection and phase-shift means, said first and second detection and phase-shift means, being spaced apart by $(\lambda g/8)n$, where $\lambda g$ is an effective wave length of a reception signal, and n is an odd integer.

21. A radio frequency identification system, comprising:
a main portion for sending first transmission data and receiving second transmission data, said main portion comprising:
carrier generation means for generating a first carrier and a second carrier;
main modulation means for modulating the first carrier with the transmission data to produce a first modulated signal; and
main transmission means for receiving the second carrier and the first modulated signal and transmitting a first radio wave based on the second carrier and the first modulated signal; and
a sub unit portion, radio communicatable with said main portion, for receiving first transmission data and sending second transmission data, comprising:
sub reception means for receiving the first radio wave transmitted from said main transmission means and recreating the second carrier and the first modulated signal from the first radio wave;
sub demodulation means for demodulating the first modulated signal into first reception data;
processor means for storing second transmission data and supplying the second transmission data based on the first reception data;
sub modulation means for modulating the second transmission data using the second carrier recreated by said sub reception means to produce a second modulated signal; and
sub transmission means for receiving the second modulated signal and transmitting a second radio wave based on the second modulated signal.

22. A radio frequency system according to claim 21, wherein said main portion of said system further comprises:
main reception means for receiving the second radio wave transmitted from said sub transmission means and recreating the second modulated signal therefrom; and
main demodulation means for demodulating the second modulated signal into second reception data.

23. A method for radio frequency identification by radio communication between a main portion and a sub portion, comprising the steps of:
(a) receiving first transmission data at the main portion;
(b) generating a first carrier and a second carrier;
(c) modulating the first carrier with the transmission data to produce a first modulated signal;
(d) transmitting a first radio wave based on the second carrier and the first modulated signal from the main portion to the sub portion;
(e) receiving the first radio wave transmitted from said main transmission means at the sub portion and recreating the second carrier and the first modulated signal from the first radio wave;

(f) demodulating the first modulated signal into first reception data;

(g) supplying second transmission data based on the first reception data;

(h) modulating the second transmission data using the second carrier recreated by said sub reception means to produce a second modulated signal;

(i) transmitting a second radio wave based on the second modulated signal from the sub portion to the main portion;

(j) receiving the second radio wave transmitted from said sub transmission means at the main portion and recreating the second modulated signal therefrom; and (k) demodulating the second modulated signal into second reception data.

24. A method according to claim 23,
wherein said sub portion includes a battery, modulation means and demodulation means, and
wherein said method further comprises the step of (1) supplying power from said battery to the modulation means only when producing the second modulated signal.

* * * * *

UNITED STATES PATENT AND TRADEMARK OFFICE
CERTIFICATE OF CORRECTION

PATENT NO. : 4,926,187
DATED : May 15, 1990
INVENTOR(S) : Hideo Sugawara et al.

It is certified that error appears in the above-identified patent and that said Letters Patent is hereby corrected as shown below:

FRONT PAGE, Col. 1, in the "FOREIGN PATENT DOCUMENTS" section insert the following:

--53-018109  2/1978 Japan
  53-142890 12/1978 Japan
  54-121093  9/1979 Japan
  57-079476  5/1982 Japan--.

Col. 1, line 6, "radiofrequency" should be --radio-frequency--.

Col. 2, line 19, "radiocommunication" should be --radio-communication--.

Col. 4, line 4, "views" should be --diagrams--.

Col. 8, line 58, "variablecapaci-" should be --variable-capaci- --.

UNITED STATES PATENT AND TRADEMARK OFFICE
CERTIFICATE OF CORRECTION

PATENT NO. : 4,926,187
DATED : May 15, 1990
INVENTOR(S) : Hideo Sugawara et al.

It is certified that error appears in the above-identified patent and that said Letters Patent is hereby corrected as shown below:

Col. 10, line 4, "radiocommunica-" should be --radio-communica- --;
line 28, "means" should be --circuit--.

Col. 13, line 11, "distributor/21." should be --distributor 121.--.

Col. 14, Equation (1) should read:

$$-\sin\omega_0 t \cdot \sin(\omega_0 t + \phi)$$
$$+ A\sin(\omega_0 + \Delta\omega)t \cdot \sin(\omega_0 t + \phi)$$
$$+ A\sin(\omega_0 - \Delta\omega)t \cdot \sin(\omega_0 t + \phi)--$$

line 30, "(1/4)" should be --(1/2)--;
line 31, "(1/4)" should be --(1/2)--;
line 61, "means" should be --circuit--;
line 64, "circuit" should be --circuits--.

Col. 18, line 40, "claim 6," should be --claim 8,--.

Signed and Sealed this

First Day of October, 1991

Attest:

HARRY F. MANBECK, JR.

Attesting Officer   Commissioner of Patents and Trademarks